US007654296B2

(12) United States Patent
Billings et al.

(10) Patent No.: US 7,654,296 B2
(45) Date of Patent: Feb. 2, 2010

(54) GROOVED SINGLE FACER BELT

(75) Inventors: Alan L. Billings, Clifton Park, NY (US); Gregory Zilker, Brush Prairie, WA (US)

(73) Assignee: Albany International Corp., Albany, NY (US)

( * ) Notice: Subject to any disclaimer, the term of this patent is extended or adjusted under 35 U.S.C. 154(b) by 252 days.

(21) Appl. No.: 10/720,902

(22) Filed: Nov. 24, 2003

(65) Prior Publication Data

US 2005/0112332 A1 May 26, 2005

(51) Int. Cl.
*B32B 37/00* (2006.01)

(52) U.S. Cl. ....................... 156/469; 156/471; 156/472; 156/473; 493/381; 493/463

(58) Field of Classification Search ......... 156/205–208, 156/469, 471, 472, 473; 428/182–186; 493/381, 493/463; 226/170–172
See application file for complete search history.

(56) References Cited

U.S. PATENT DOCUMENTS

| | | | | |
|---|---|---|---|---|
| 3,368,933 | A * | 2/1968 | Wicker | 156/498 |
| 3,377,950 | A * | 4/1968 | Squitieri et al. | 101/401.2 |
| 4,427,734 | A | 1/1984 | Johnson | |
| 4,559,258 | A | 12/1985 | Kiuchi | |
| 4,567,077 | A | 1/1986 | Gauthier | |
| 5,360,656 | A | 11/1994 | Rexfelt et al. | |
| 5,792,323 | A | 8/1998 | Grondahl | |
| 5,837,080 | A | 11/1998 | Grondahl | |
| 5,857,605 | A * | 1/1999 | Welch et al. | 226/95 |
| 6,186,209 | B1 | 2/2001 | Lanthier | |
| 6,231,928 | B1 | 5/2001 | McGahern | |
| 6,276,420 | B1 | 8/2001 | Lanthier | |
| 6,428,874 | B1 | 8/2002 | McGahern et al. | |
| 6,470,944 | B1 | 10/2002 | Billings et al. | |
| 2002/0102894 | A1 * | 8/2002 | Hansen | 442/240 |

FOREIGN PATENT DOCUMENTS

| | | | |
|---|---|---|---|
| DE | 197 16 716 | A | 10/1998 |
| EP | 0 414 629 | | 2/1991 |
| EP | 0877119 | A2 * | 11/1998 |
| EP | 0950508 | A2 * | 10/1999 |
| WO | WO 03/014447 | A1 | 2/2003 |

OTHER PUBLICATIONS

Definition of the term “coating” from dictionary.com, date unknown.*

* cited by examiner

*Primary Examiner*—Jeff H Aftergut
(74) *Attorney, Agent, or Firm*—Frommer Lawrence & Haug LLP; Ronald R. Santucci

(57) ABSTRACT

The present invention relates to a single facer corrugator belt having a base structure. The base structure includes an inside and an outside surface and a machine or running direction and a cross machine direction. The base structure is formed by machine direction yarns and cross machine direction yarns and has grooves formed in a surface of the base structure. Alternatively, the corrugator belt may include includes holes formed in a surface of the base structure.

16 Claims, 15 Drawing Sheets

GROOVED SINGLE FACER BELT

BACKGROUND OF THE INVENTION

1. Field of the Invention

The present invention relates to corrugated paper board manufacture and to the belts required by the machines used to manufacture that variety of paper board. More specifically, the present invention relates to the belts that may be used on the single-facer section of a corrugated board production line.

2. Description of the Prior Art

In the manufacture of corrugated paper board, a so-called core paper is heated by steam, which makes it more pliable, and is then fed into a nip formed between a pair of toothed rollers whose teeth mesh, thereby corrugating the core paper in a uniform, undulating pattern. Starch paste is subsequently applied to the crests of the corrugated core paper, which is then mated to a liner paper in a press nip. There, the corrugated core paper and liner paper are bonded together to form a completed sheet, which can then be further processed as desired.

In one machine used for this purpose in the prior art, the press nip is formed by one of the toothed or corrugating rolls and a pressure roll. In another machine of a more recent design, the press nip is extended in the running direction through the use of a belt instead of a pressure roll. The belt holds the corrugated core paper and liner paper together against the corrugating roll for a significant portion of its circumference.

The belt experiences severe operating conditions. Because heat is used to vaporize moisture in the core paper, the belt operates in a high-temperature environment and under high tension. Further, the belt continually runs against the teeth on the corrugating roll albeit with the sheet in between the belt and roll to develop the required bonding pressure between the core paper and the liner paper. Moreover, the belt must be flexible yet have lengthwise strength and widthwise rigidity sufficient to withstand wrinkling, which may cause the belt to drift undesirably from side to side.

Still further, the belt faces two opposing problems. Initially, it is necessary that the belt have a sufficient coefficient of friction that the liner paper can be drawn into the nip by the belt and attached to the core paper. As a result there have been several solutions proposed for increasing the coefficient of friction on the surface of the belt including coating the belt with resins, needling fibers into the belt, and a combination of both of these procedures, as discussed in commonly assigned U.S. Pat. Nos. 6,470,944 and 6,276,420, both of which are incorporated herein by reference. Although both of these solutions increase the coefficient of friction sufficient to enable the belt to draw the liner paper into the nip, in certain instances they may create an opposing problem as the paper exits the nip in that the coefficient of friction can be so great that the bonded core and liner papers are drawn in the direction of travel of the belt. This results in decreased quality of the corrugated board. Accordingly, there is a need for a corrugator belt that has the ability to adequately vent moisture from the board, release the board cleanly after the nip, and has a sufficiently high coefficient of friction that the liner paper can be drawn into the nip.

The present invention provides an improvement and/or solution to the problems inherent in the use of a belt of the foregoing varieties.

SUMMARY OF THE INVENTION

It is the object of the present invention to provide an improved belt for use in the manufacture of corrugated paper board.

It is a further objective of the present invention to provide a corrugated paperboard with enhanced moisture removal properties.

It is a further object of the present invention to provide a belt that demonstrates the improved release characteristics immediately upon installation of the belt, and through the life of the belt.

It is a further object of the present invention to provide a belt with improved release characteristics with sufficient frictional characteristics to propel the corrugated board through the nip.

The present invention relates to a single facer corrugator belt having a base structure. The base structure includes an inside and an outside surface and a machine or running direction and a cross machine direction. The base structure is formed by machine direction yarns and cross machine direction yarns and has grooves formed in the coated outside surface of the base structure.

The present invention is also directed to a single facer corrugator belt having a base structure. The base structure has an inside and an outside surface and a machine or running direction and a cross machine direction. The base structure is preferably formed by machine direction yarns and cross machine direction yarns, and after coating includes means formed in the coated outside surface of the structure to remove moisture.

The various features of novelty, which characterize the invention, are pointed out in particularity in the claims annexed to and forming a part of this disclosure. For a better understanding of the invention, its operating advantages and specific objects attained by its uses, reference is made to the accompanying descriptive matter in which preferred embodiments of the invention are illustrated.

BRIEF DESCRIPTION OF THE FIGURES

For a more complete understanding of the invention, reference is made to the following description and accompanying drawings, in which.

DETAILED DESCRIPTION OF THE PREFERRED EMBODIMENTS

Figure 1:
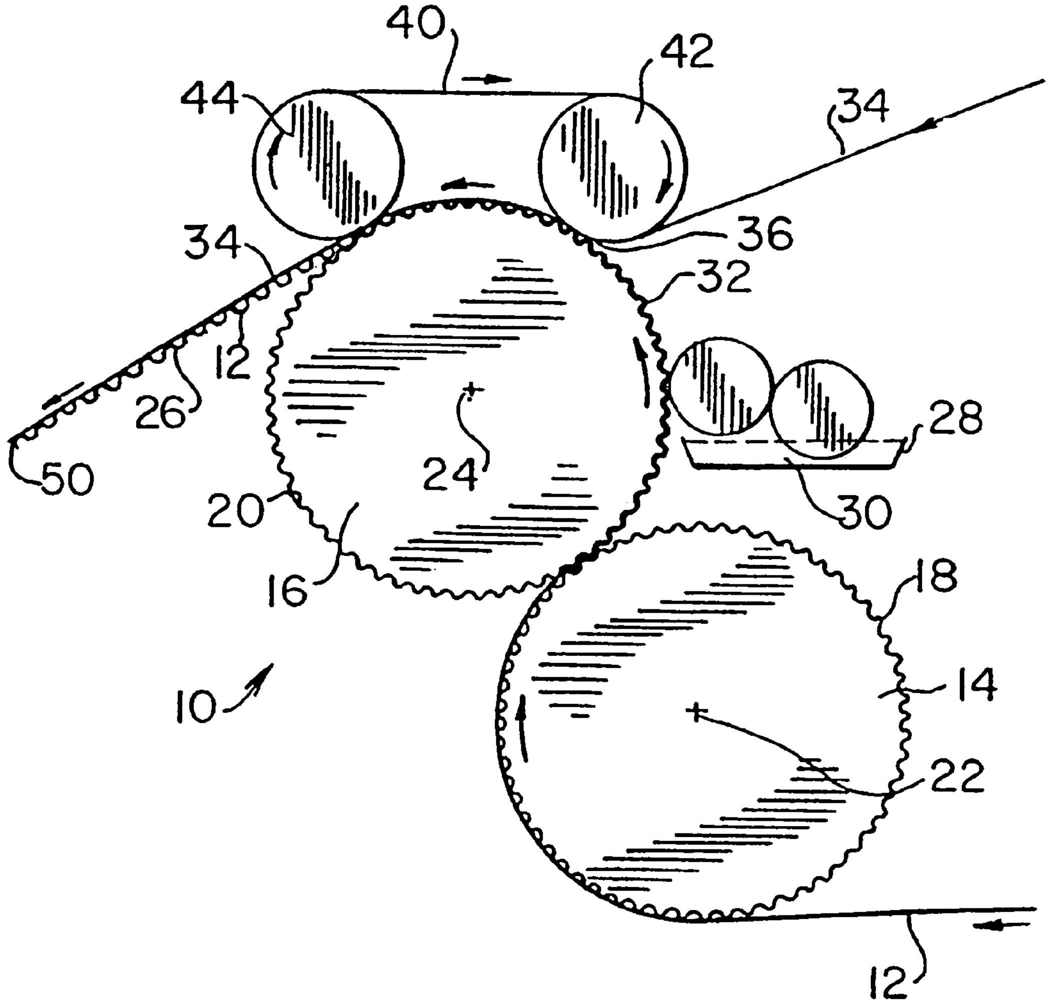
FIG. 1 shows a typical belted single-facer corrugated board production line.

Turning now to these figures, FIG. 1 is a schematic view of a typical belted single-facer section 10 of a corrugated board production line. A core paper 12, previously exposed to steam, which makes it more pliable, is fed continuously between a pair of cooperating rolls 14, 16. The rolls 14,16 have uniformly spaced, peripheral teeth 18, 20, which mesh as the rolls 14, 16 rotate about their respective, parallel axes 22, 24. The meshing teeth 18, 20 produce corrugations 26 in the core paper 12.

A coating mechanism 28 applies a starch paste 30 to the crests 32 of the corrugations 26 in the core paper 12.

The corrugated core paper 12 is continuously applied to a liner paper 34 at point 36, where a belt 40, which is trained around a pair of spaced rollers 42, 44, passes around roller 42. The spaced rollers 42, 44 are so disposed that belt 40 bears against roll 16, and both may form nips with roll 16, so that the belt 40, trained thereabout, bears against roll 16 for the entire interval between spaced rollers 42, 44 forming an extended nip between roll 16 and belt 40. Heat is applied to the corrugated core paper 12 and liner paper 34 through at least one of the rollers 42, 44, belt 40 and roll 16. The heat vaporizes water absorbed by the corrugated core paper 12 when the corrugated core paper 12 was exposed to steam and dries the starch paste 30.

The rollers 42, 44 are situated so that the teeth 20 on roll 16 bear against the outside surface of the belt 40 over a substantial circumferential extent as the system operates. The teeth 20 maintain the proper registration of the corrugated core paper 12 as it is advanced. At the same time, the roll 16 firmly presses the side of the core paper 12 with the paste thereon against the liner paper 34 to effect bonding there between. The corrugated core paper 12 with the liner paper 34 attached thereto exits as a completed product 50 from between the roll 16 and the roller 44.

Figure 2:
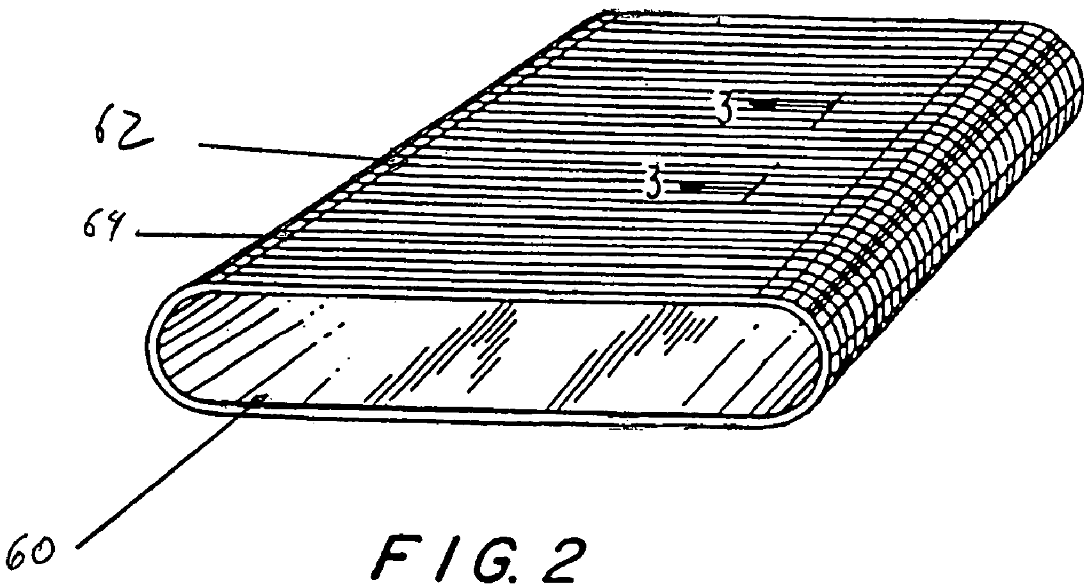
FIG. 2 is a perspective view of a belt according to one embodiment of the present invention.

A perspective view of the belt 40 is provided in FIG. 2. The belt 40 has an inner surface 60 and an outer surface 62. The outer surface 62 is provided with a plurality of grooves 64 extending substantially in the machine direction around the belt 40.

Figure 3:
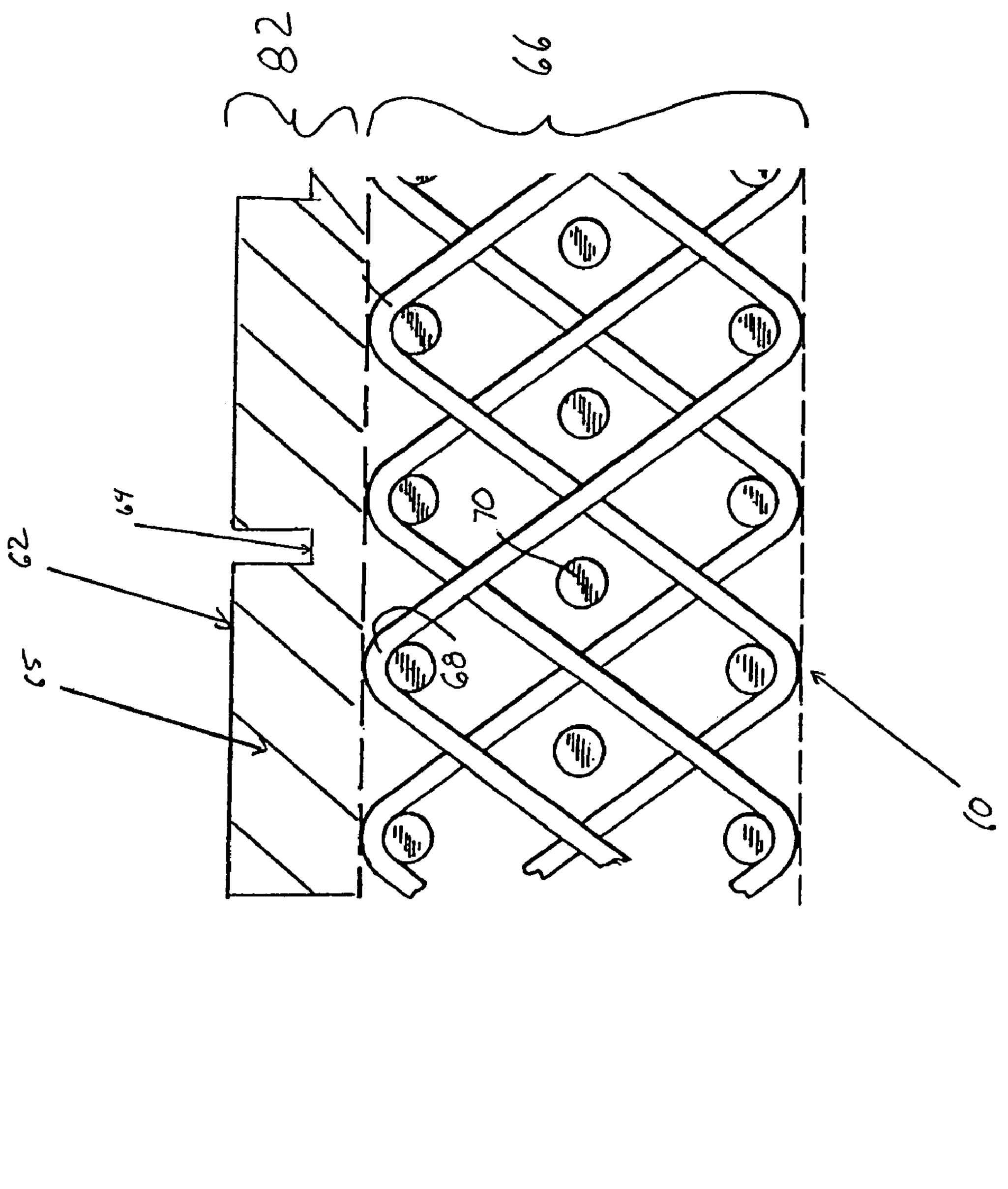
FIG. 3 is a cross sectional view of the belt shown in FIG. 2 taken along line 3-3 with a impermeable resin layer.

FIG. 3 is a cross section of belt 40 taken as indicated by line 3-3 in FIG. 2. The cross section is taken in the transverse, or cross-machine, direction of belt, and shows that belt includes a base structure 66. As shown in FIG. 3, the base structure 66 may be woven from transverse, or cross-machine direction, yarns 68 and longitudinal, or machine-direction, yarns 70. Base structure 66 is depicted as having been woven flat, the transverse yarns 68 being weft yarns weaving over, under and between the stacked pairs of longitudinal warp yarns 70 in a duplex weave and joined to form an endless belt. It should be understood, however, that base structure 66 may be woven endless. It should be further understood that base structure 66 may be woven in a single-layer weave, or in any other weave suitable for the purpose.

The base structure 66 may alternatively be a non-woven structure in the form of, for example, a mesh as in an assembly of transverse and longitudinal yarns, which may be bonded together at their mutual crossing points to form a fabric. Further, the base structure 66 may be a knitted or braided fabric, or a spiral-link belt of the type shown in U.S. Pat. No. 4,567,077 to Gauthier, the teachings of which are incorporated herein by reference. The base structure 66 may also be extruded from a polymeric resin material in the form of a sheet or membrane, which may subsequently be provided with apertures.

Alternatively still, the base structure 66 may comprise non-woven mesh fabrics, such as those shown in commonly assigned U.S. Pat. No. 4,427,734 to Johnson, the teachings of which are incorporated herein by reference.

Further, the base structure 66 may be produced by spirally winding a strip of woven, non-woven, knitted, mesh, or braided according to the methods shown in commonly assigned U.S. Pat. No. 5,360,656 to Rexfelt et al., the teachings of which are incorporated herein by reference. The base structure 66 may accordingly comprise a spirally wound strip, wherein each spiral turn is joined to the next by a continuous seam making the base structure endless in a longitudinal direction. A belt 40 having a base structure 66 of this type is disclosed in commonly assigned U.S. Pat. Nos. 5,792,323 and 5,837,080, the teachings of which are incorporated herein by reference. One or more layers of this type can be utilized, again a seam optionally may be introduced for installation on the machine.

The base structure 66 may be woven, or otherwise assembled, from warp yarns and weft yarns comprising yarns of any of the varieties used in the manufacture of paper machine clothing and industrial process fabrics. That is to say, the base structure 66 may include natural or metal yarns, monofilament, plied monofilament, multifilament, plied multifilament or yarns spun from staple fibers of any of the synthetic polymeric resins used by those skilled in the art in the manufacture of fabrics intended for use in high-temperature environments. For example, the base structure 66 may be manufactured from yarns of the following materials: polyaramids, such as Nomex®, and Kevlar®; polyphenylene sulfide (PPS), which is more commonly known as Ryton®; an aromatic polyester, which is commonly known as VECTRAN®; polyetheretherketone (PEEK); polyester and blends thereof. For example, the base structure may comprise yarns of Kevlar® in the machine direction and Ryton® or polyester monofilament yarns in the cross-machine direction.

Figure 4:
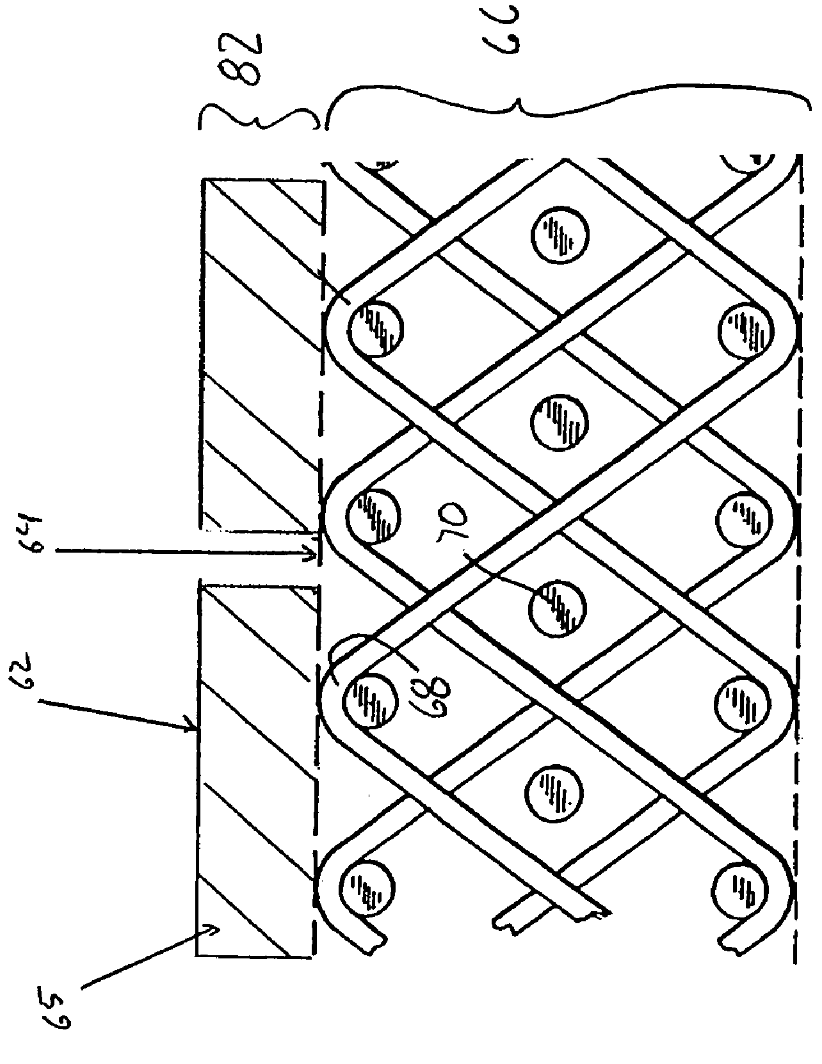
FIG. 4 is a cross sectional view of the belt shown in FIG. 2 taken along line 3-3 with a permeable resin layer.

One aspect of the present invention is that the outer surface 62 of belt 40, that is, the surface which contacts the board may be formed by a polymeric resin coating 82, as shown in FIGS. 3 and 4. The inner surface 60 of belt 40, that is, the surface which slides over rollers 42 and 44 may also be formed by a polymeric resin coating, not shown.

Alternatively, the entire structure may be impregnated with resin applied from the outer surface 62 under pressure and forced through the structure such that sufficient resin resides on the sheet contact surface so that the grooves can be formed in said surface. The belt 40 may be permeable or impermeable.

In one embodiment, grooves 64 can be cut into the polymeric resin coating and either have sufficient depth to extend past the depth of the resin coating 82 and into the base structure 66, as shown in FIG. 4. In a second embodiment, the grooves of belt 40 can have a depth less than the thickness of the resin coating 82 to insure that the resin coating remains impermeable to fluid, as shown in FIG. 3.

A land area 65 separates the grooves from one another. The grooves 64 and land areas 65 may be of substantially equivalent widths, however, in the preferred embodiment the grooves are narrower than the land width, as shown in FIGS. 3 and 4.

The grooves 64 may be provided by cutting a continuous single groove that spirals about the endless loop of the belt on the outer surface. The orientation of the resulting grooves 64 may deviate from the machine or longitudinal direction by a small angle. However the provision of grooves 64 in this manner is contemplated by the inventor as falling within the scope of the invention.

Moreover, grooves 64 may alternatively be provided by cutting two continuous grooves which spiral about the endless loop of the belt 40 on outer surface 62 in opposite directions, that is, one describing a right-handed spiral and the other describing a left-handed spiral. Further, the grooves 64 need not be perfectly straight but may have some degree of curvature or waviness, or longitudinal direction by deviating no more than 45 degrees from there at any point, so long as they remain primarily oriented in the machine.

Still further the grooves 64 need not be continuous in their longitudinal direction which may correspond to the machine direction of the belt. Rather, grooves 64 may have a length less than the length of the belt 40, such as approximately 1 of the length of the belt.

The shape, dimensions, spacing, and orientation of grooves 64 may vary in accordance with the efficiency of the moisture removal and release characteristics.

Figure 7:
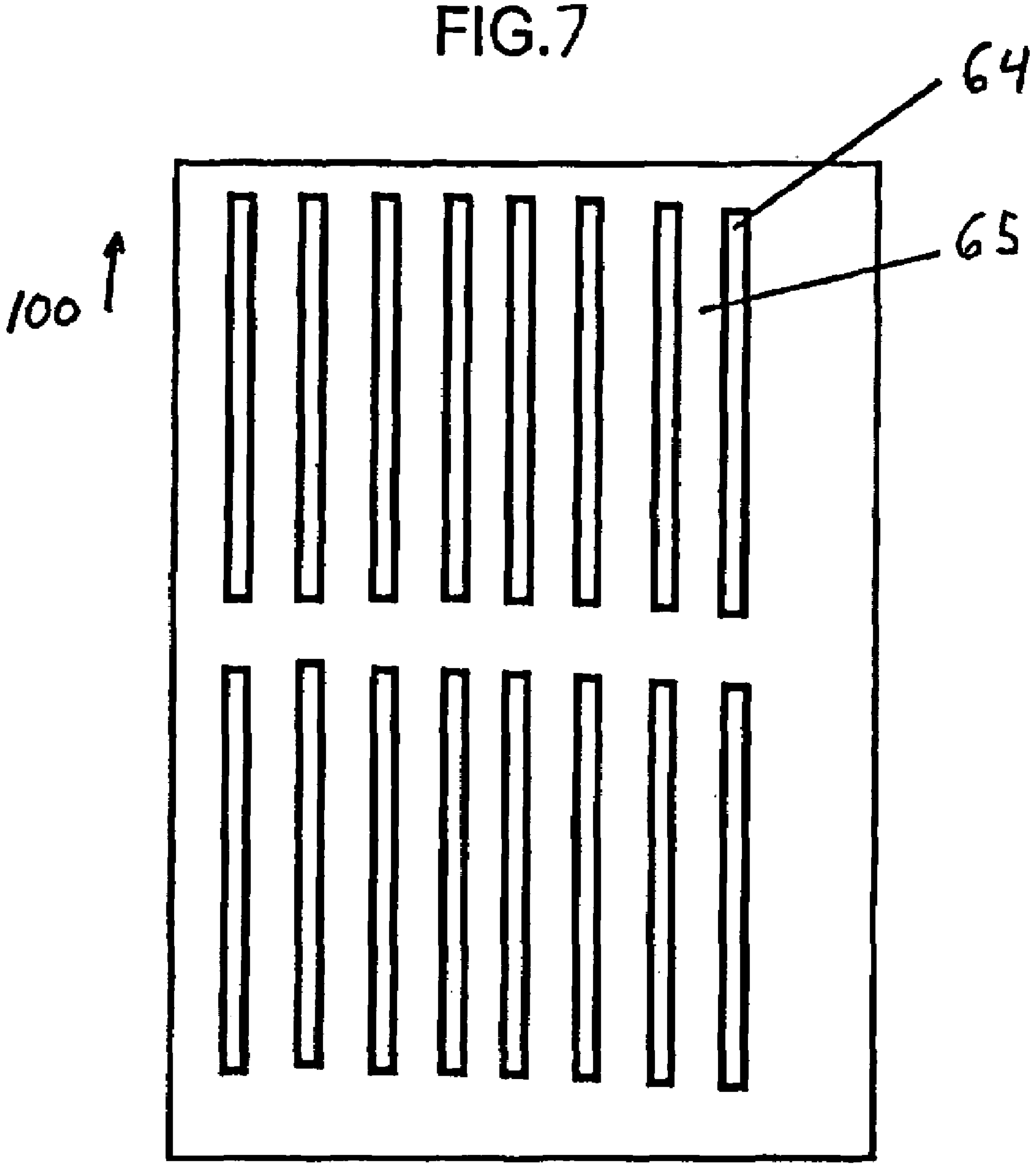
FIGS. 7-14 are top views showing alternative groove patterns in both the longitudinal and transverse directions according to the present invention.

FIGS. 7-14 illustrate several arrangements of grooves. As shown in FIG. 7, grooves 64 may be arranged in a equal number of rows wherein a line intersecting the ends of each groove in a row is substantially perpendicular to the longitudinal direction 100. However, the number of grooves in a row and distances between adjacent rows in the longitudinal direction on belt 40 may vary in accordance with the application, and/or the desired efficiency of the dewatering process. Grooves 64 are separated from one another by the land areas 65.

Figure 8:
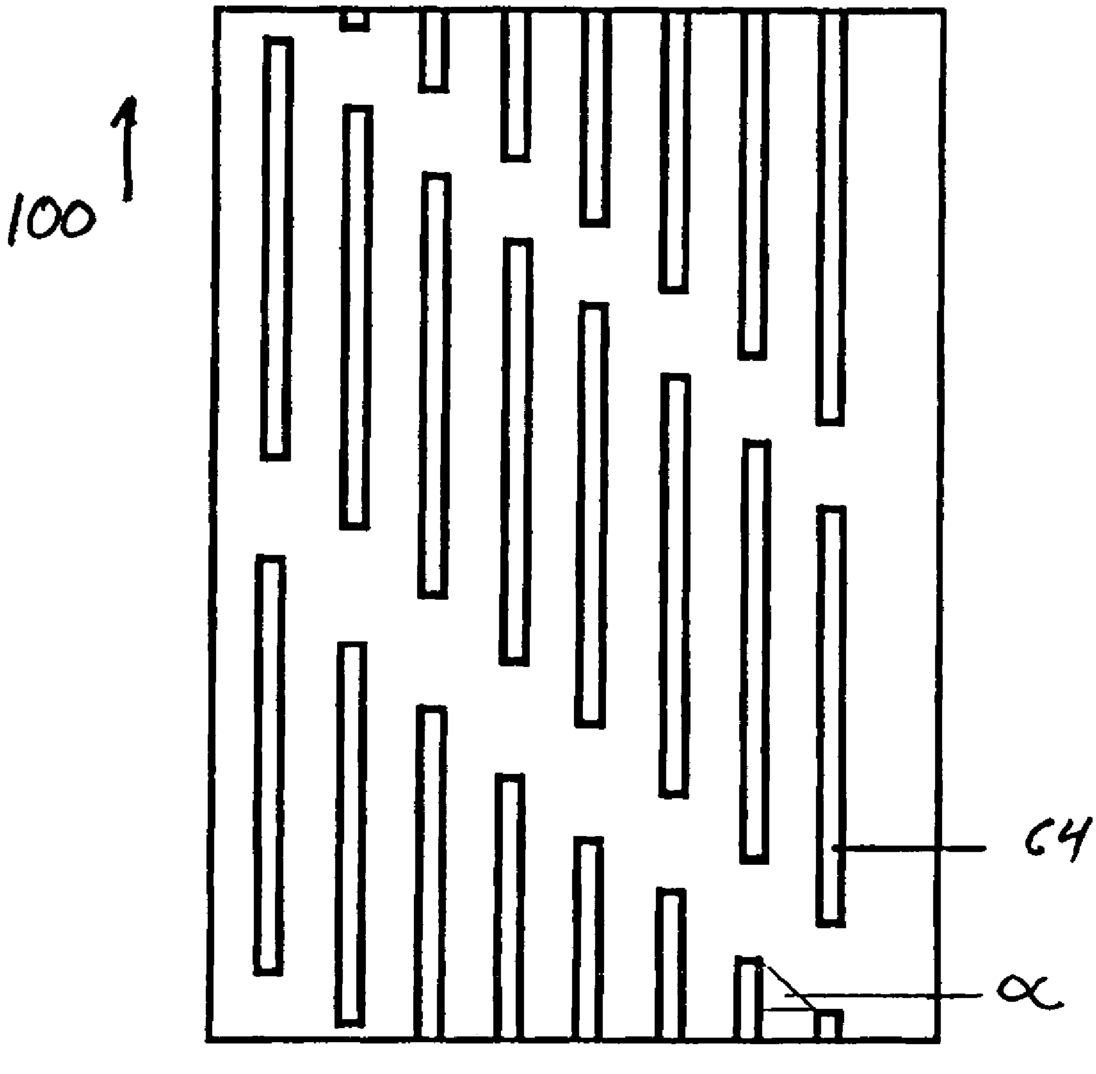

FIG. 8 is a top view of a belt 40 in accordance with another embodiment of the present invention. In this example, grooves 64 are formed in rows in the longitudinal direction of belt 40, in which a line intersecting the ends of each groove in a row is at an angle $\alpha$ to the transverse direction. Angle $\alpha$ may be 25-30°.

Figure 9:
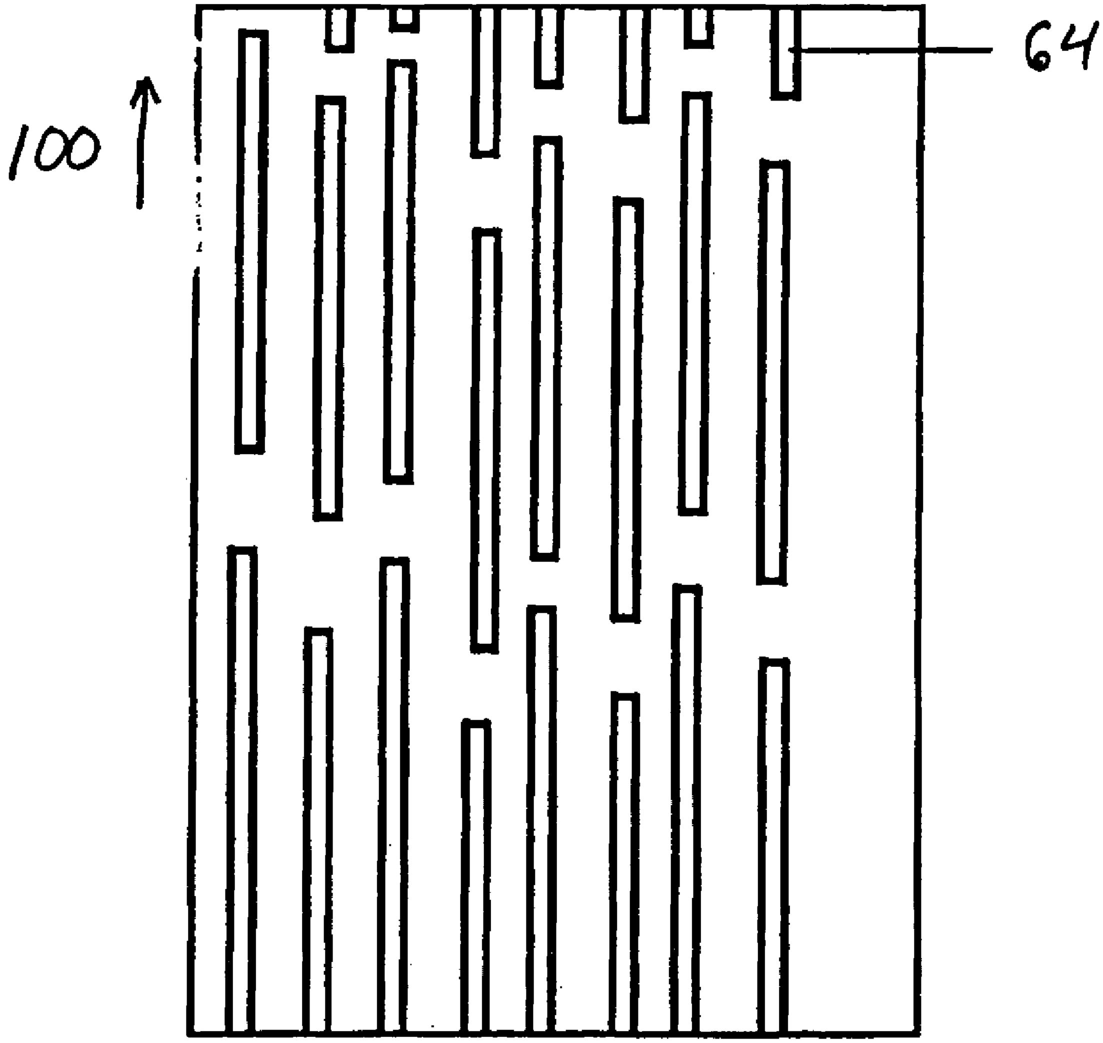

FIG. 9 is a top view of a belt 40 in accordance with another embodiment of the present invention. Here, grooves 64 are formed in staggered rows.

The length of groove 64 in the machine direction may be any length. Further, grooves 64 and land areas 65 may be arranged in any pattern that provides desirable moisture removal and release characteristics. Grooves 64 and land areas 65 are depicted in FIGS. 7-9 as being of different widths, although this need not be the case. Nevertheless, land areas 65 may be thought of as narrow pillars of cured polymeric resin aligned in the machine direction on outer surface 62 of the belt 40.

Although the grooves have been described as running in a longitudinal or machine direction, the present invention is not so limited. That is, the grooves could be arranged in any other direction, such as in a transverse or CD direction, or in a direction which is at an angle $\theta$ (such as $0<\theta<90°$) relative to the machine direction. In such situation, the "length" may be shorter than sides of the belt 40. Accordingly, the pattern of grooves 64 disclosed in FIGS. 7-9 may be applied to grooves running in these other directions as, for example, shown in FIGS. 10 and 11.

Figure 10:
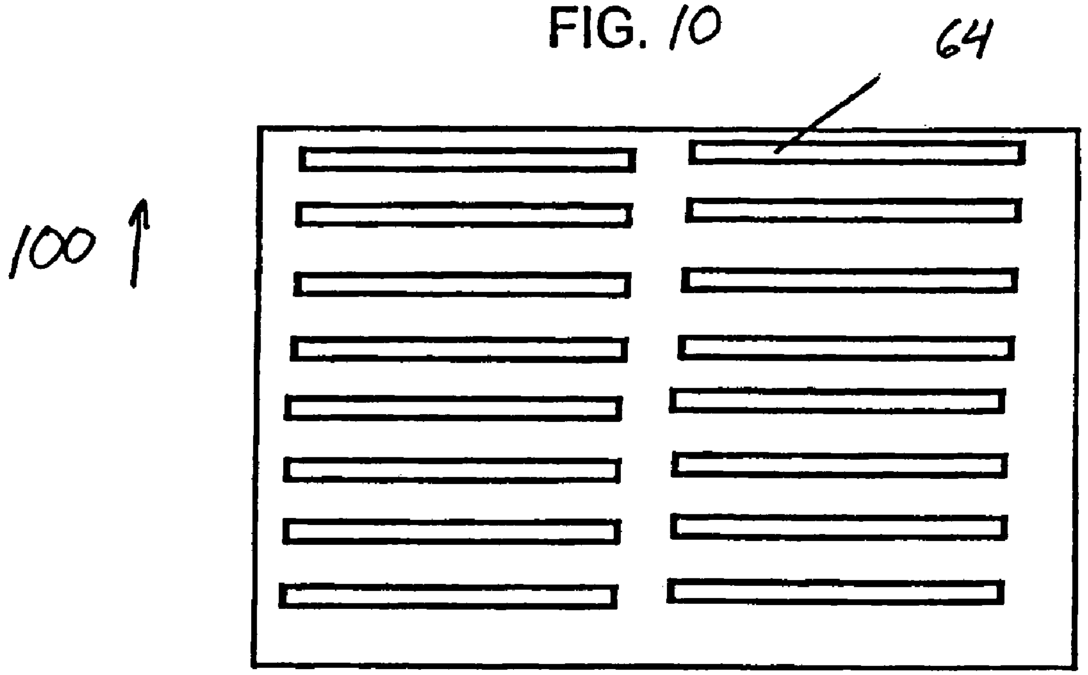
Figure 11:
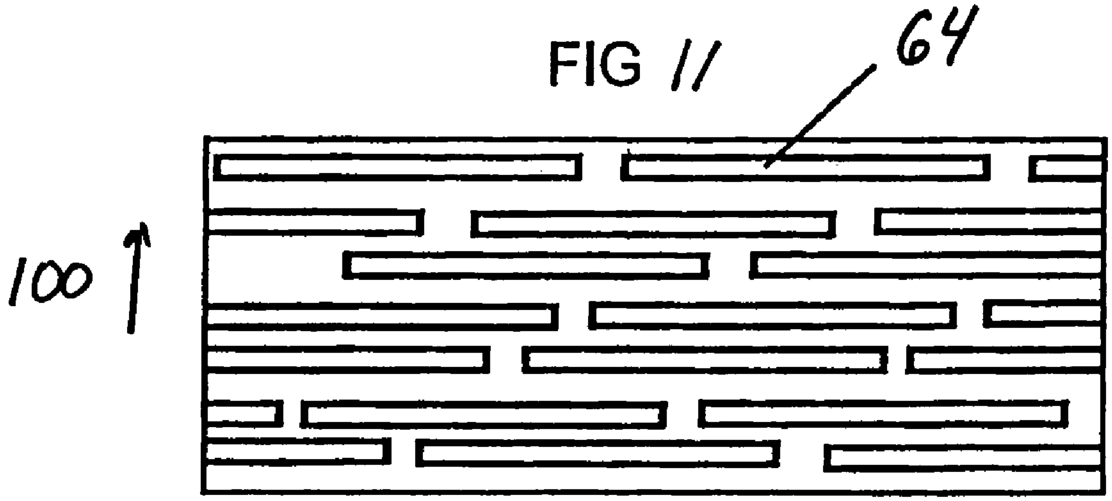
Figure 12:
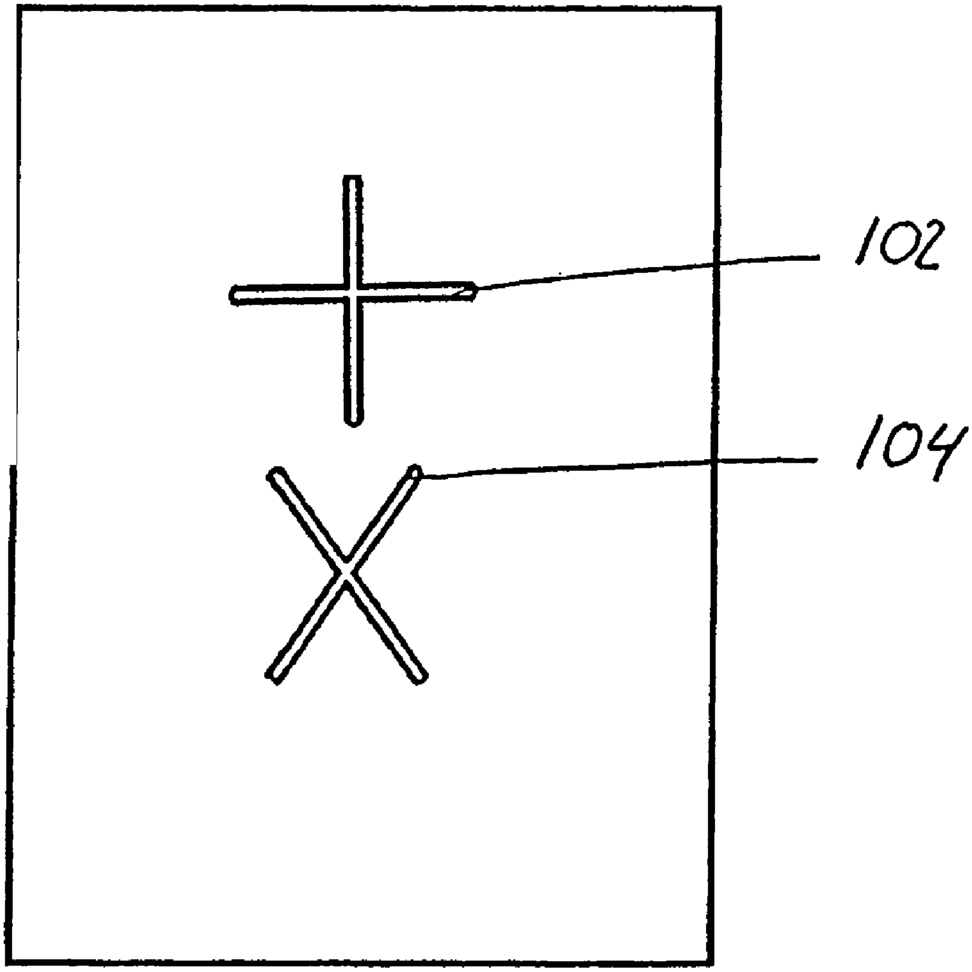
Figure 13:
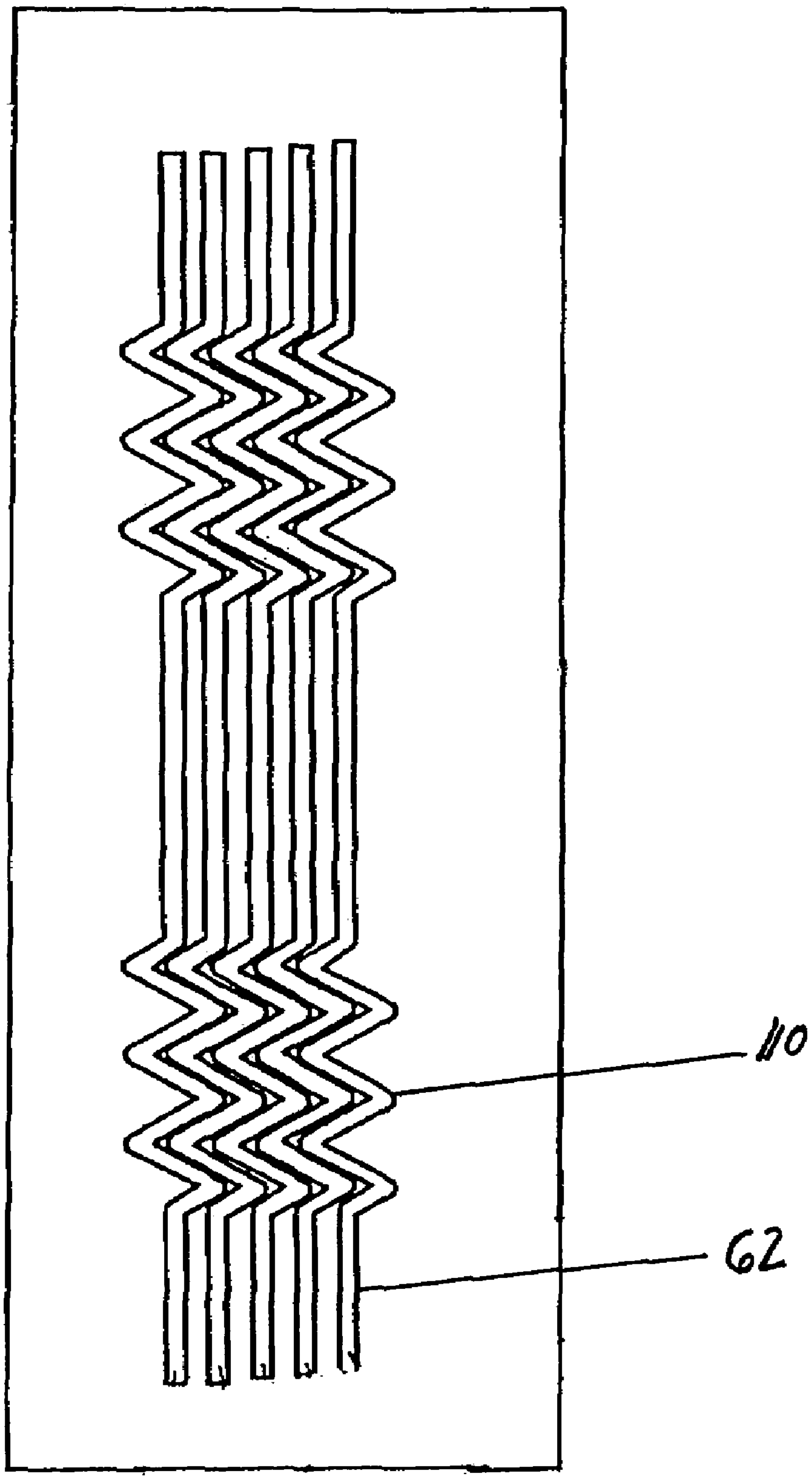
Figure 14:
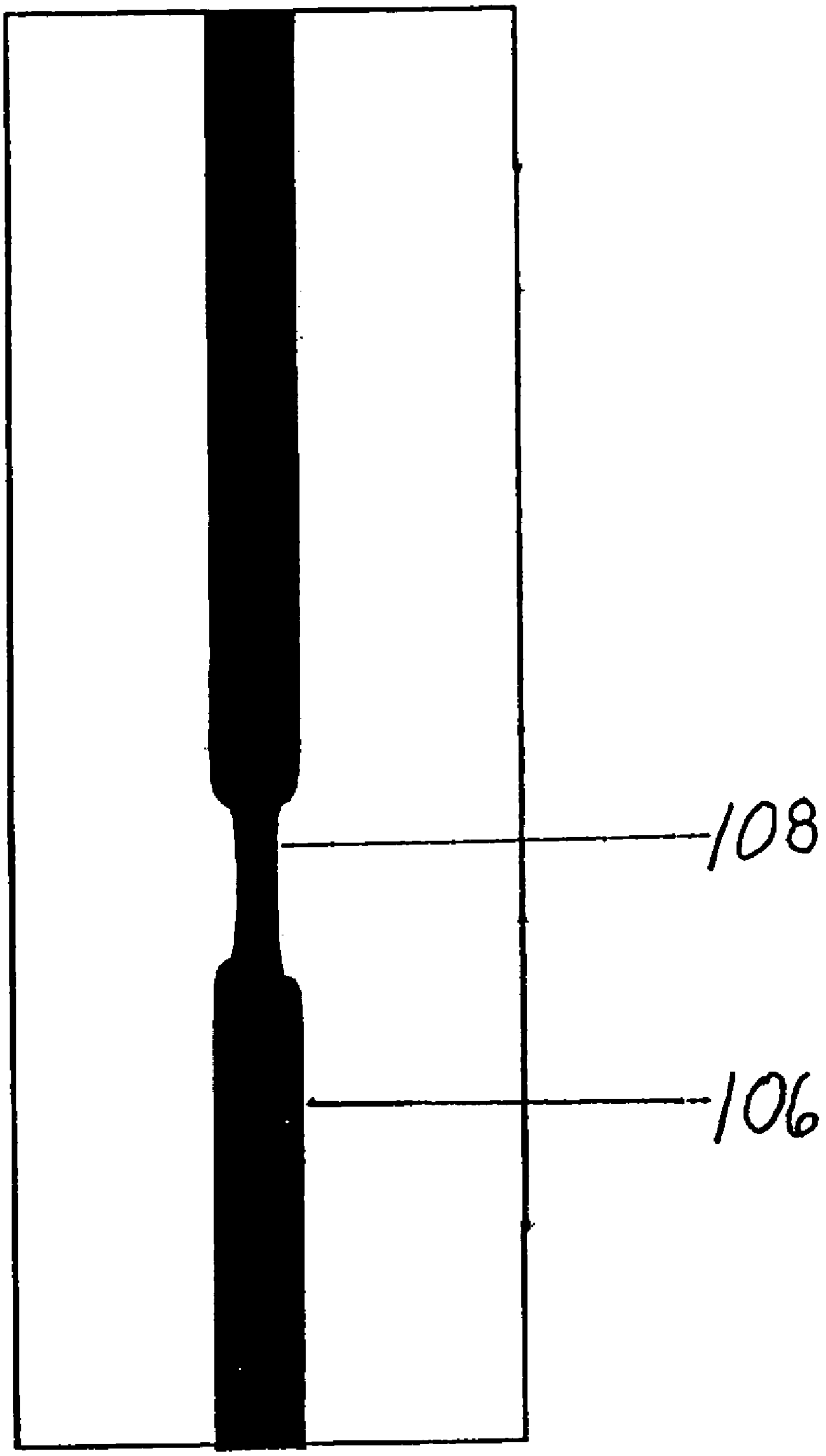
Figure 15:
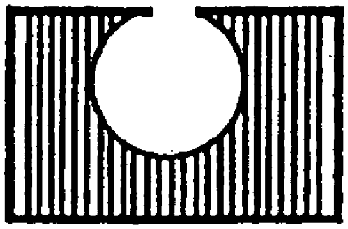
FIGS. 15-20 are cross-sectional views of groove patterns formed in a belt according to the present invention.
Figure 16:
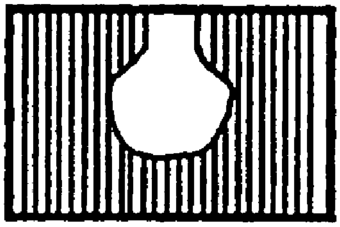
Figure 17:
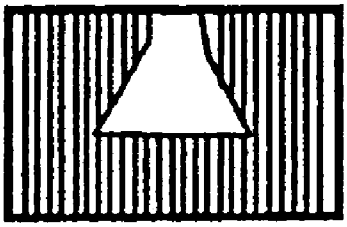
Figure 18:
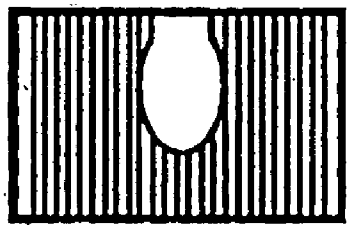
Figure 19:
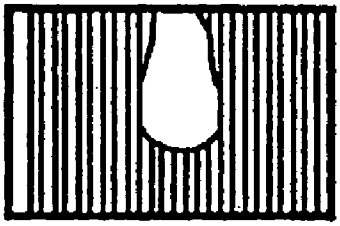
Figure 20:
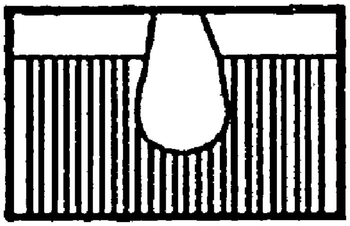

As shown in FIG. 10, grooves 64 may be arranged in a number of columns wherein a line intersecting the ends of each groove in a column is substantially perpendicular to the transverse direction. However, the number of grooves in a column and distances between adjacent columns in the CD or transverse direction on belt 40 may vary in accordance with the application and/or the desired efficiency of the dewatering process. Alternatively, grooves 64 may be formed in a staggered pattern, such as in belt 40 shown in FIG. 11. Still further, the grooves 64 may be continuous in length in the transverse or CD direction, that is, such grooves may extend transversely from a first position located at or close to a first edge of the belt to a second position located at or close to the opposite edge of the belt.

Additionally the present belt may have other patterns of non-continuous grooves. As an example, and with reference to FIG. 12, the present belt may have a number of first grooves (such as groove 102) and/or a number of second grooves (such as groove 104). Each of such grooves may have an overall length and width that is less than the borders of the belt 40. Further, the present belt may have a plurality of grooves oriented in a first direction (such as the MD direction) wherein a number of such grooves are non-continuous grooves and a number of such grooves are continuous grooves.

A belt 40 according to the present invention may include non-standard type continuous grooves. As an example, and with reference to FIG. 13, a belt 40 may have a number of continuous grooves 64 each having a straight portion followed by a zigzag portion 110 followed by another straight portion 64 and so forth. As another example, and with reference to FIG. 14, a belt 40 may have one or more grooves 64 each having a number of first portions 106 having a first width and a number of second portions 108 having a second width that is smaller than the first width.

In addition to the above-described patterns or arrangements, the present belt may have any other pattern or combination of continuous and/or non-continuous grooves oriented in any one or more directions wherein all or a relevant portion thereof is shorter than the borders of the arcuate pressure shoe.

The above-described grooves are primarily utilized for moisture removal and release. The actual spacing, size, shape and/or depth of each groove may be determined by the desired characteristic.

Furthermore, the shapes of the grooves utilized in the present belt may have a number of different cross-sectional shapes. Examples of several of such cross-sectional shapes are shown in FIGS. 15-20.

Figure 5:
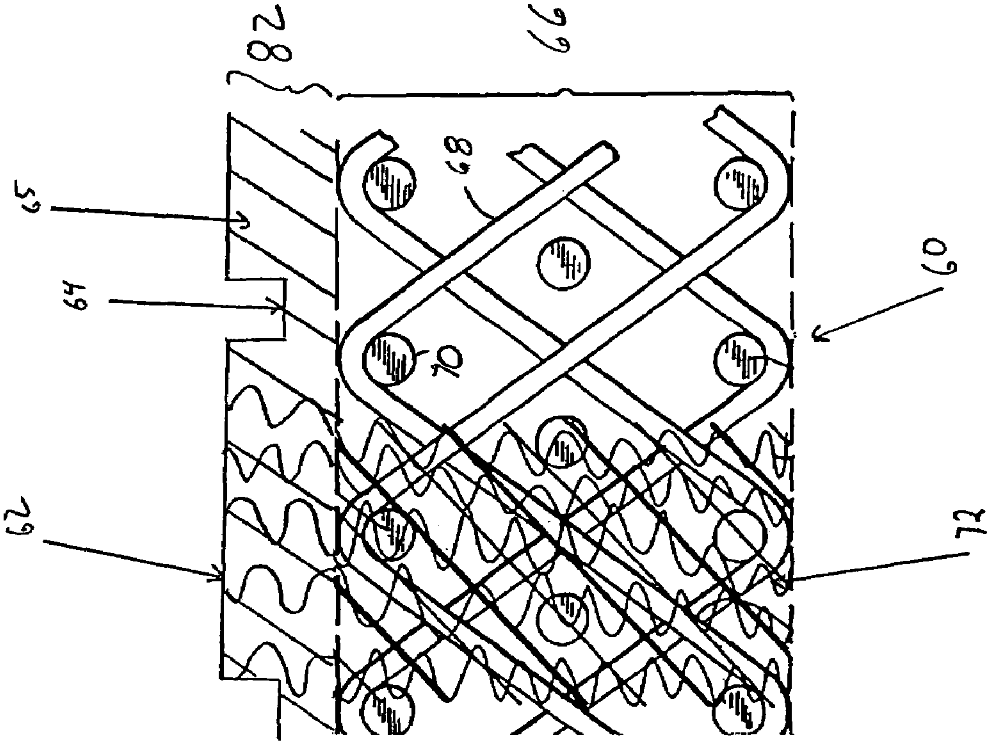
FIG. 5 is a cross sectional view of the belt shown in FIG. 2 taken along line 3-3 with an impermeable resin layer and having needled fibers.
Figure 6:
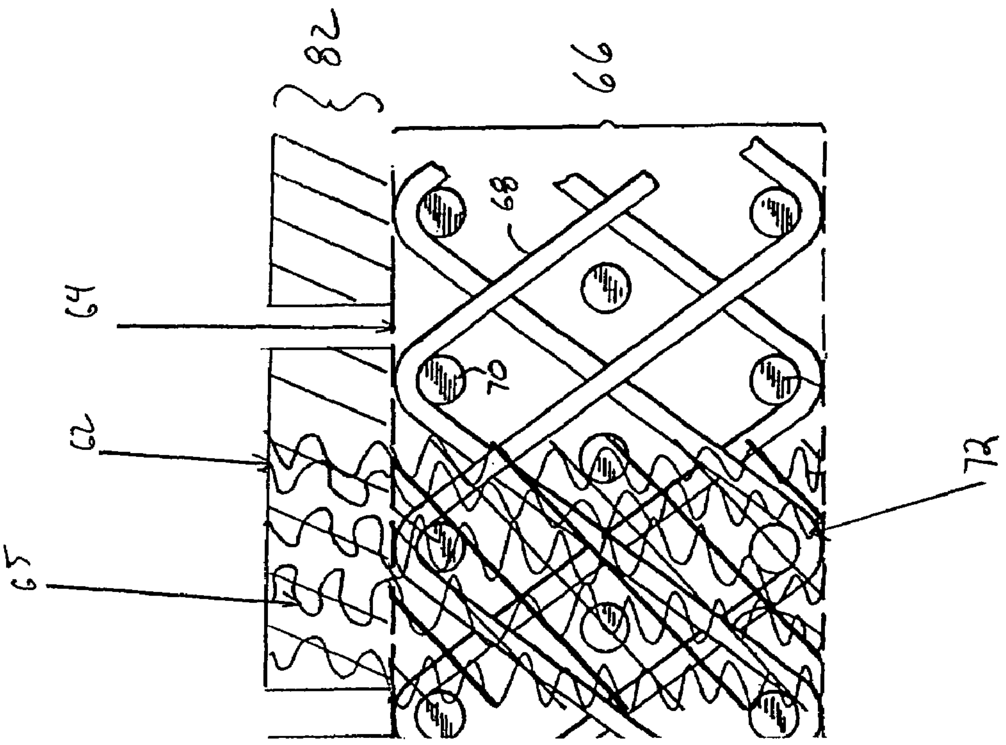
FIG. 6 is a cross sectional view of the belt shown in FIG. 2 taken along line 3-3 with a permeable resin layer and having needled fibers.

As is to be appreciated, the shapes of the grooves of the present belt are not limited to these shapes. In another aspect of the present invention, the base structure 66 may be needled with a web 72 of staple fiber material in such a manner that some of the fibers are driven into the base structure as shown in FIGS. 5 and 6. One or more layers of staple fiber material may be needled into the base structure 66, and the web 72 may extend partially or completely there through. The web 72 of staple fiber material may also form a layer covering a surface of the base structure 66. For the sake of clarity, the web is included in only a portion of FIGS. 5 and 6. As shown in FIG. 5 the needled base structure may include grooves 64 and an impermeable resin layer 65. Alternatively, the resin layer may be permeable having grooves formed to the depth of the resin layer as shown in FIG. 6.

The staple fiber material needled into the base structure 66 may be any of the synthetic polymeric resins used by those skilled in the art in the manufacture of fabrics intended for use in high-temperature environments. For example, the staple fiber material may comprise staple fibers of any of the following materials: polyaramids, such as Nomex® and Kevlar®; polyphenylene sulfide (PPS), which is more commonly known as Ryton®; polyetheretherketone (PEEK); and polyester.

The integrity and durability of the needled belt may be further improved by coating the base structure 66 with a polymeric resin material 82. The coating can provide a structure that is either impermeable or permeable. Coating materials include polymeric resins such polyurethane, polyethylene, polyamide, polyvinyl chloride, and ionomer resins sold under the trade name SURLYN®, those of skill in the art will understand that other resin materials could be used provided they provide sufficient frictional coefficients and impermeability to fluids.

As shown in FIGS. 5 and 6, the grooves 64 may be formed into the outer surface 62 of the belt 40 that has been needled with fibers 72. If the belt is coated with a resin, and after it is cured, the grooves 64 can be cut to either have sufficient depth to extend past the depth of the resin coating and into the base structure 66, or can be formed to a depth less than the thickness of the resin coating to insure that the resin coating remains impermeable to water. Alternatively, the resin may be impregnated into the base structure 66 of the belt 40

Similarly the grooves 64 may be pressed into the outer surface 62 by an embossing device before the polymeric resin 82 has been cured, or may be molded into the belt 40 where it is manufactured using a molding process.

In another aspect of the preset invention, in the place of the grooves 64, a series of holes or vents could be drilled into the belt 40. These holes can be used in conjunction with any of the base structures 66 described herein. According to one aspect of the present invention to blind holes are formed to a depth less than the thickness of a resin layer applied to the belt thus forming an impermeable resin layer. Alternatively, the holes can be formed to a depth equal to or greater than the thickness of the resin layer thus forming a permeable resin layer. In either of the foregoing examples, the belt 40 may include fibers needled into the base to form a fibrous web according to the teachings of the grooved belt embodiments above. Still further, the holes can be formed to extend completely through the belt 40 whether formed with a permeable layer or impregnated with resin to form a substantially impermeable belt 40.

The use of the grooves 64 and/or holes enables the present invention to overcome the shortcomings of the prior art. Both needled and un-needled resin coated or impregnated belts can be manufactured with grooves or holes and result in superior separation of the belt 40 from the completed corrugated board, resulting in increased quality in the production of corrugated board. The resin layer may alternatively be permeable or impermeable depending upon the depth of the grooves and the application of the resin.

The use of a vented surface having either grooves or holes operates to remove moisture from the corrugated board. In the case of continuous grooves the moisture is vented directly to the atmosphere. In the case of discontinuous grooves or holes, these features act as temporary storage facilities that release the moisture to the atmosphere when outside the nip. So it should be understood that the surface 62 of the belt 40 is multifunctional in that it optimizes moisture venting and removal and provides for smooth sheet release after the nip.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

What is claimed is:

1. A single facer corrugator belt in combination with a corrugated paper board machine, said belt comprising:

a base structure, said base structure having an inside and an outside surface that contacts paper board and a machine or running direction and a cross machine direction, said base structure being formed by machine direction yarns and cross machine direction yarns;

a liquid polymeric resin coating applied and cured on said outside surface of said base structure, wherein said polymeric resin does not substantially impregnate the base structure and that the polymeric resin coating forms a distinct layer on said outside surface of said base structure; and a plurality of grooves formed in said polymeric resin coating;

wherein said plurality of grooves aid in improved paper board release and increased rate of board moisture removal.

2. The combination of claim 1, wherein said grooves are continuous.

3. The combination of claim 1, wherein said grooves are discontinuous.

4. The combination of claim 1 further comprising at least one layer of fibers needled into said base structure and extending at least partially there through.

5. The combination of claim 4, wherein the needled fibers are impregnated with polymeric resin.

6. The combination of claim 1 wherein said grooves extend partially through said polymeric resin coating, said polymeric resin coating forming an impermeable layer on said outside surface.

7. The single facer corrugator belt of claim 1, wherein said grooves extend through said polymeric resin layer forming a permeable layer on said at least one surface.

8. The combination of claim 1, wherein the base structure is woven, non-woven, knitted, mesh, braided, spiral-linked or spiral wound.

9. The combination of claim 1 wherein said grooves are arranged in rows wherein a line intersecting the ends of each groove in a row is substantially perpendicular to the machine or cross-machine direction.

10. The combination of claim 1 wherein said grooves are arranged in rows wherein a line intersecting the ends of each groove in a row is at an angle to the machine or cross machine direction.

11. The combination of claim 10 wherein the angle is between 25 and 30 degrees.

12. The combination of claim 1 wherein grooves are formed in staggered rows.

13. The combination of claim 1 wherein said grooves comprise a plurality of non-continuous and continuous grooves.

14. The combination of claim 1 wherein said grooves comprise a first straight portion followed by a zigzag portion, followed by a second straight portion.

15. The combination of claim 1 wherein said grooves comprise a number of first portions having a first width and a number of second portions having a second width that is smaller than the first width.

16. The combination of claim 1 wherein said grooves are shaped having an opening which is smaller than a remaining portion of the groove.

* * * * *